July 25, 1961

C. E. BERRY 2,993,853

ELECTROLYTIC CELL

Filed April 15, 1957

INVENTOR.
CLIFFORD E. BERRY

BY

*Christie, Parker & Hale*

ATTORNEYS

July 25, 1961　　　　　　C. E. BERRY　　　　　2,993,853
ELECTROLYTIC CELL
Filed April 15, 1957　　　　　　　　　　　　3 Sheets-Sheet 2

INVENTOR.
CLIFFORD E. BERRY
BY
Christie, Parker & Hale
ATTORNEYS

July 25, 1961 C. E. BERRY 2,993,853
ELECTROLYTIC CELL
Filed April 15, 1957 3 Sheets-Sheet 3

INVENTOR.
CLIFFORD E. BERRY
BY Christie, Parker & Hale
ATTORNEYS

United States Patent Office 2,993,853
Patented July 25, 1961

2,993,853
ELECTROLYTIC CELL
Clifford E. Berry, Altadena, Calif., assignor, by mesne assignments, to Consolidated Electrodynamics Corporation, Pasadena, Calif., a corporation of California
Filed Apr. 15, 1957, Ser. No. 652,880
3 Claims. (Cl. 204—195)

This invention relates to an improved electrolytic cell of the type employing a normally solid hygroscopic electrolyte.

Cells currently finding use in commercial moisture analyzers are illustrative of this type of electrolytic cells and the invention is described as applied to an electrolytic moisture analyzer. A typical cell comprises a pair of bifilar space wound conductive wire coils supported in an enclosing tube and with a film of a hygroscopic electrolyte such as phosphorous pentoxide deposited on the inner surfaces of the tube to electrically bridge the spaces between adjacent turns of the two wire helixes.

The two coils comprise the electrodes and when the electrolyte is conductive, in this example only upon absorption of moisture, an electrolytic cell exists in effect between the alternately spaced turns of the electrode coils. In operation, therefore, as moisture is absorbed by the electrolyte from a gas stream flowing axially through the coil, the electrolyte becomes conductive, current flows between the coils in the regions of conductivity and the water is electrolyzed to hydrogen and oxygen. The electrolyte is thereby continuously regenerated and the electrical energy consumed is a rigorous measure of the moisture absorption in accordance with Faraday's Laws.

Heretofore a cell of this type has been fabricated by extruding a tetra fluoroethylene (known commercially as "Teflon") sleeve over the exterior of the coil. This has proven a difficult and unreliable procedure. Since the "Teflon" does not bond to the wires, presumably because of chemical inertness and high surface tension, they are not effectively immobilized giving rise to short circuiting problems in practice. The same property of the plastic makes it difficult to adhere a uniform electrolyte film to the interior surfaces of the system.

I have now developed a procedure for encapsulating the coils of an electrolytic cell of this character in a glass tube which procedure eliminates all of the afore-mentioned difficulties and further results in a more rigid, structurally stable system. Other advantages of the glass system will be pointed out in the course of the following description.

An electrolytic cell in accordance with the invention comprises bifilar spaced conductive wire coils, a tubular glass sheath circumscribing the coils and projected inwardly between the turns of the coil to support them in spaced apart relation, and a solid electrolyte film formed on the exposed inside surfaces of the glass sheath to form a conductive bridge between the adjacent turns of the bifilar coils.

Further, in accordance with the invention the apparatus described is fabricated by a procedure which comprises inserting the coil system into a glass tube having an inside diameter just slightly larger than the outside diameter of the coils, establishing a pressure drop between the outside and inside of the tube, and heating the tube wall to the softening point while maintaining a pressure drop between the outside and inside of the tube whereby the tube shrinks around the coils and forms helical protrusions intervening between adjacent coil turns to support the turns in spaced apart relation. Preferably in this procedure only a relatively small part of the tube is heated at any given time, the heat being localized and progressively applied along the length of the tube in a direction toward the vacuum connection.

The interior surfaces of the system may be thereafter coated with suitable electrolyte in conventional fashion as for example by passing a slurry of electrolyte through the tubular system.

The term "glass" as used herein is intended to encompass various silica glasses and in general any vitreous material which is malleable in a fairly wide temperature range and which is hard and generally inelastic below such range.

The processes of the invention as employed for fabrication of the cell is described in conjunction with the accompanying drawings which are illustrative of the process steps. In the drawings, FIG. 1 shows in elevation a mandrel upon which the coils are being wound;

Figure 6:
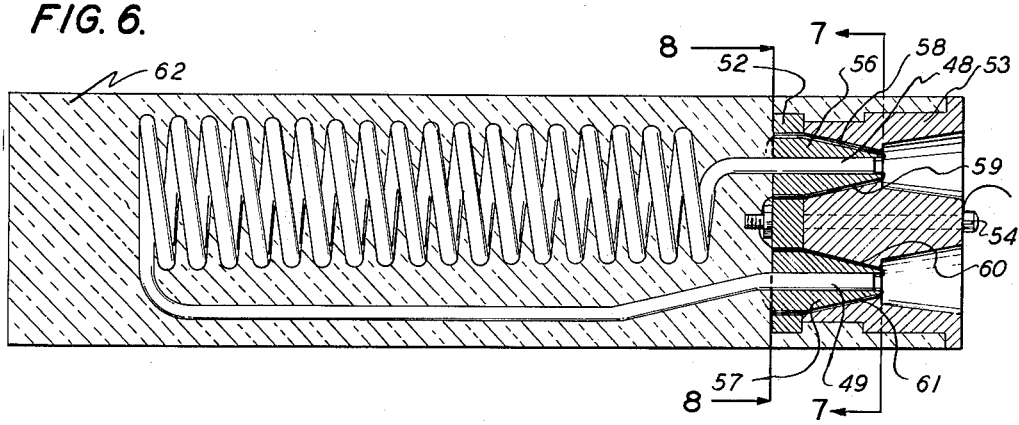
FIG. 6 is a sectional elevation of a completed cell unit.
Figure 7:
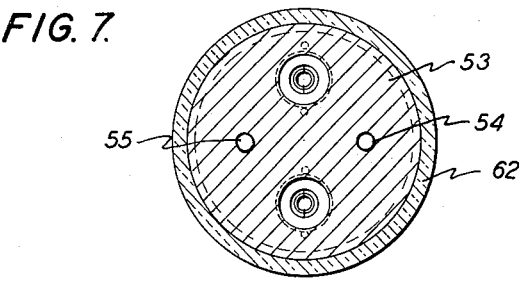

FIG. 7 has a transverse sectional elevation taken on line 7—7 of FIG. 6; and

Figure 8:
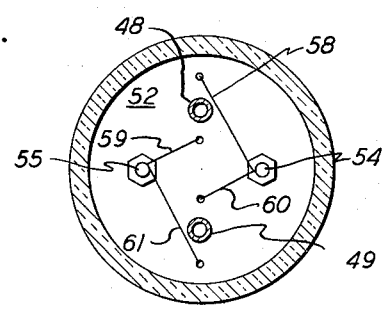

FIG. 8 is a transverse elevation taken on the line 8—8 of FIG. 6.

Figure 1:
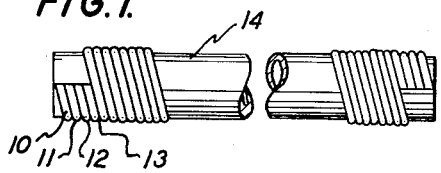

FIG. 1 shows the procedure by which the coil matrix is formed. Four separate strands 10, 11, 12 and 13 of wire are helically wound on a tubular copper mandrel 14. The four wire strands are alternately for example platinum and copper. For example in this instance wires 10 and 12 may be assumed to be platinum and wires 11 and 13 may be assumed to be copper. In a typical system although obviously there is no limitation to this effect, the wire may be of a diameter of approximately .003 inch wound on a copper tubing mandrel of approximately .020 inch OD. The purpose of the copper wire is as an automatic spacer between the interwound platinum coils. At a later stage in the process the copper is removed from the system as will be described. The use of the spacer winding may be eliminated if the two platinum coils are initially space wound but it is considerably more difficult to achieve the desired structural uniformity by this technique.

Figure 2:
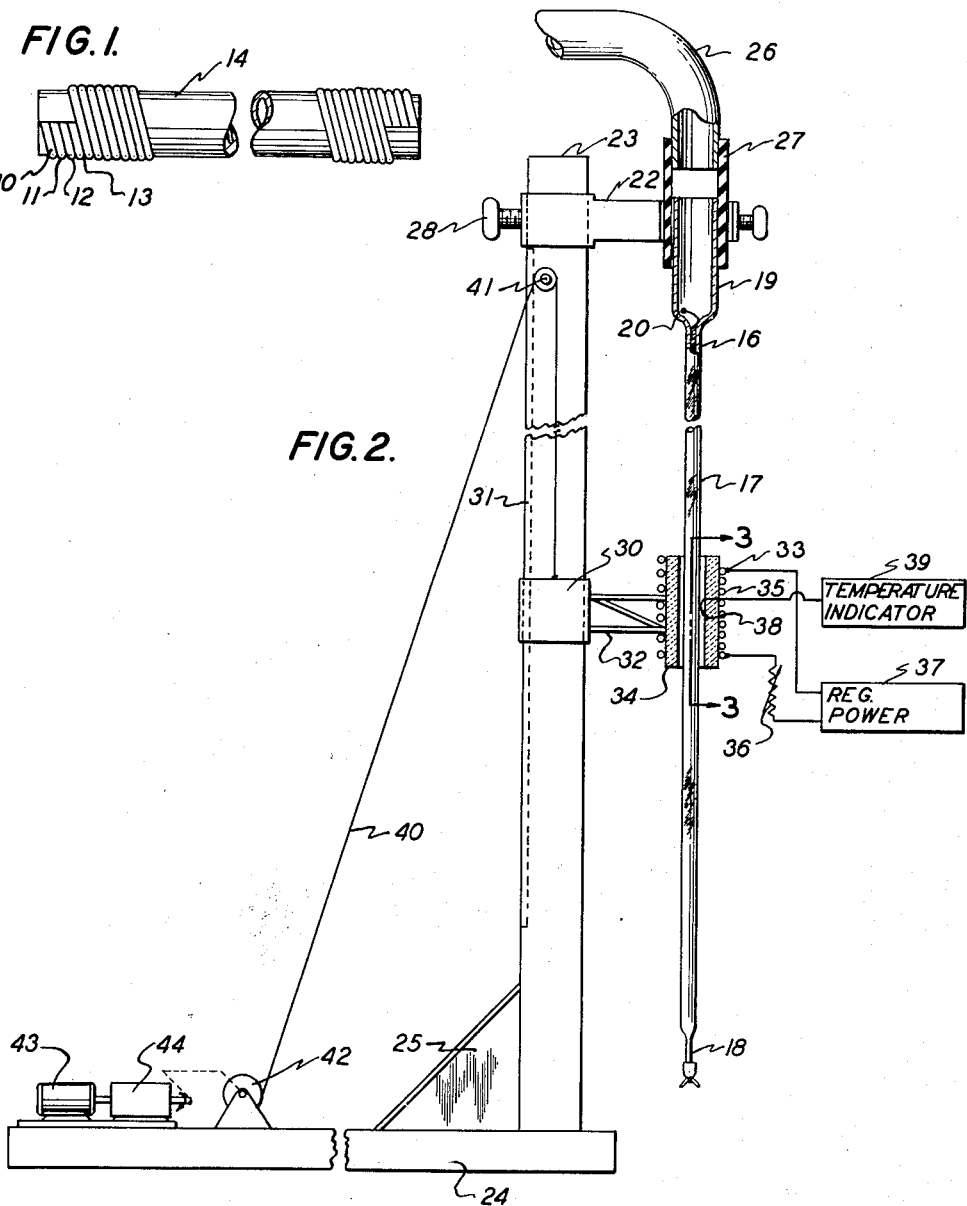
FIG. 2 is an elevation showing schematically apparatus for encapsulating the coil system in a glass tube.

In the next stage of process a length of the wire wound mandrel is inserted in a somewhat longer length of glass tubing. By way of example, a single length of the wire wound system of about 36 inches in length may be inserted in a somewhat longer glass tube. Referring to FIG. 2 the wire wound mandrel assembly 16 is inserted in a glass tube 17 one end of the tube being drawn down and sealed at 18 and the other end being connected to an enlarged diameter end section 19 into which a bent end 20 of the coil extends. As shown in this drawing, the glass tube 17 is suspended vertically by means of a clamp 22 slidably mounted on a post 23, the post being supported from a base 24 and reinforced by one or more braces 25. A vacuum source not shown is connected by a flexible tube 26 and a conventional bushing 27 to the enlarged end section 19 of the glass tube. The tube is held in a fixed position by clamping the bracket 22 to the post 23 by means of a finger nut 28.

A carriage 30 is slidably mounted on the post 23 and is keyed thereon against rotational motion into a keyway 31 in conventional fashion. The carriage 30 by means of a framework 32 supports a cylindrical heater 33 which is mounted to circumscribe glass tube 17 and to travel along the tube responsive to motion of the carriage 30. The heater may take the form of an insulating tubular core 34 composed of a suitable refractory material such as steotite with a heating coil 35 wrapped on its circumference. The coil 35 is connected through a variable resistor or rheostat 36 across a regulated power supply 37. A thermocouple 38 is supported along the inside circumference of the heater core and is connected in conventional manner to a temperature indicator 39.

A fine cable 40 is connected at one end to the carriage 30 carried over a pulley or slip ring 41 and wound on a capstan 42 supported on the base 24. An electric motor 43 is connected through a suitable gear box 44 to drive the capstan at a predetermined speed so as to raise the carriage 30 and heater 33 from an extreme lowered position slowly upwardly along the length of the tube 17.

Figure 3:
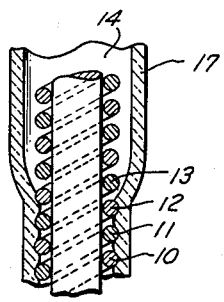
FIG. 3 is an enlarged sectional elevation taken on the line 3—3 of FIG. 2.

While the heater is caused to travel along the length of the tube 17 a partial vacuum is maintained within the tube by reason of its connection through tube 26 to a vacuum source. The vacuum source may be a conventional mechanical pump. The effect of the pressure drop between the exterior and interior of the tube coupled with the localized heating to a temperature above the softening point of the glass produces a deformation as illustrated in the enlarged view of FIG. 3 which is taken on the line 3—3 of FIG. 2. In this figure the glass tube 17 is shown encircling the wire coil system comprising the adjacently wound wires 10, 11, 12 and 13 on the mandrel 14. As the portion of the glass encircled by the moving heater is raised in temperature above its softening point, it shrinks about the coil system fitting snugly against the coil turns and flowing inwardly at least a part of the way between adjacent turns. In FIG. 3 the lower extremity of the illustrated portion of tube 17 is shown conforming in this manner to the exterior configuration of the coil system whereas the upper portion of the illustrated section of the tube is as yet undeformed. This condition of the tube conforms approximately to that which would exist in the vertical center of the heater segment. The deformation of the glass is so uniform as a result of the conditions inducing it that it retains a nearly perfect cylindrical exterior configuration even after the reduction in diameter.

Again, by way of illustrative example only, if a coil of the dimensions above suggested is inserted in a Pyrex glass tube of approximately .080 inch inside diameter, the heater 33 may be approximately two and one-half inches in length, is caused to travel along the tube at a rate of approximately 0.3 inch per minute, and the temperature at thermocouple 38 is maintained at about 850° C.

Figure 4:
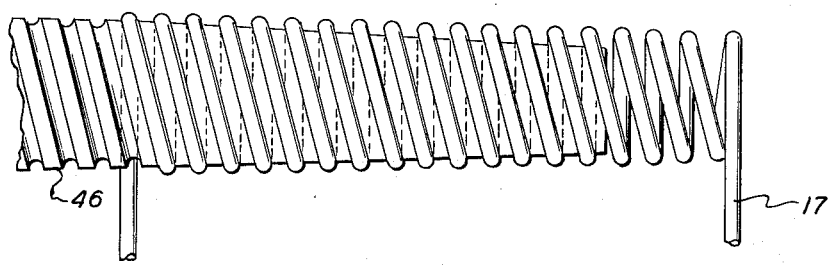
FIG. 4 is an elevation view showing the manner of helically winding the encased coil.

The next stage of the process in fabrication of the cell is illustrated schematically in FIG. 4. At this point the system consists of the four wire coils wound on a tubular mandrel and encapsulated in a glass tube in the manner above described. For convenience in packaging and use of the cell, this system is wound in a tapered helix as shown in FIG. 4. This operation is accomplished on a tapered helically threaded carbon mandrel 46, the taper being for the sole purpose of making it possible to remove the coil after it has wound on the mandrel by simply backing the mandrel out of the coil.

Figure 5:
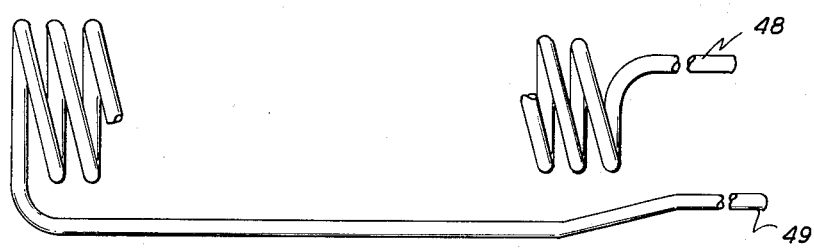
FIG. 5 is an elevation of the completed helically wound system.

In the next stage of the procedure as illustrated in FIG. 5, and preparatory to final packaging, the extremities of the glass tube encasing the coil system are brought out to a common end to ultimately form the inlet and outlet ports of the cell. These ends are identified in FIG. 5 by the reference characters 48 and 49. At this stage a length of the glass tube is stripped off the opposite ends of the coil-mandrel system and the wires are unwrapped from the mandrel down to the respective ends of the glass tube. The portion of the copper mandrel exposed by this stripping procedure is cut away. At this stage the end fitting which will be described in greater detail in conjunction with FIG. 6 are attached to the end extremities of the glass tube and before the system is potted in the unit illustrated in FIG. 6 the copper mandrel and the alternate copper coils 11 and 13 are removed by etching with nitric acid. Herein lies one of the important advantages of the rigidity furnished by the glass housing in that the etching can be accomplished and the system electrically tested for shorts at an early stage of the fabrication. Not only are rejections cut down by the firmer support furnished by the glass but any rejections that are incurred are less costly for this reason.

Referring to FIG. 6 which is a sectional elevation of the potted unit, the end fittings are assembled prior to potting and constitute a Teflon lead through member 52 and a companion cap member 53 which is clamped to the member 52 by bolts 54 and 55 (see FIG. 7). The clamping action presses conical nipples 56 and 57 of the lead through into firm engagement with the ends 48 and 49 respectively of the tube. Wire leads 58 and 59 extending from tube 48, 60 and 61 extending from tube 49 are threaded out the respective ends of the glass tube downwardly between the walls of the conical nipples and the associated pressure member and are fastened to the post 54 and 55 in the manner shown particularly in FIG. 8.

With the end fitting completed, the unit is suspended in a capsule (not shown) of desired size and potted with an epoxy resin to form a solid case 62 as illustrated. To complete the cell, a slurry of phosphoric acid is passed through it and dried and electrolyzed to phosphorous pentoxide by passing an electrolyzing current through the electrode coils. The operation of the cell for moisture analysis has been previously described.

The glass tubular encapsulation results in a cell structure which can be simply and quickly fabricated. A rigid system results which, as pointed out above, can be electrically tested at an early stage in its fabrication and also because of rigidity is very easy to pot. The invention permits the selection of a glass with properties that adapt it to bonding with the platinum electrodes or with other types of electrodes, and also the opportunity to select a glass suitable for operation at elevated temperatures. Perhaps of even greater import is the inherent quality of the glass which presents a more readily wettable surface than do plastic coverings such as Teflon. The increased wettability of the interelectrode surface can be demonstrated to result in a more uniform unagglomerated electrolyte film with a consequently faster response time.

Although the invention has been described with particular reference to a moisture detection electrolytic cell, it is not so limited in scope and is useful in any electrolytic system of this nature.

I claim:

1. An electrolytic cell comprising a first electrically conductive coil having a plurality of turns, a second electrically conductive coil having a plurality of turns, the turns of the second coil being disposed between the turns of the first coil, a tubular glass sheath circumscribing the coils and projecting inwardly between the turns of the coils to enclose and support the coil turns in spaced apart relation, an electrolytic film on the inner surface of the glass sheath to form a bridge between adjacent turns of the coils, the glass sheath and enclosed coils being in coil form, an enclosing body of plastic embedding and immobilizing the glass sheath with opposite ends thereof being accessible from an exterior portion of the plastic means for flowing a fluid through the glass tube in contact with the inner surface of the wires and electrolyte film, and means for applying a voltage drop across the electrolytic film between adjacent turns of the coils.

2. An electrolytic cell comprising a first electrically conductive coil having a plurality of turns, a second electrically conductive coil having a plurality of turns, the turns of the second coil being disposed between the turns of the first coil, a tubular glass sheath enclosing the coils and forming a substantially unobstructed passage therewithin, the turns of the coils being rigidly secured to the sheath so that the coil turns are supported in a spaced apart relation, an electrolytic film on the inner surface of the glass sheath to form a bridge between adjacent turns of the coils, means for flowing a fluid through the substantially unobstructed passage within the glass sheath so as to contact the inner surface of the coil turns and electrolytic film, and means for applying a voltage drop across the electrolytic film between adjacent turns of the coils.

3. An electrolytic cell comprising a first electrically conductive coil having a plurality of turns, a second electrically conductive coil having a plurality of turns, the turns of the second coil being disposed between the turns of the first coil, a tubular glass sheath enclosing the coils and forming a substantially unobstructed passage therewithin, the turns of the coils being rigidly secured to the sheath so that the coil turns are supported in a spaced apart relation, an electrolytic film on the inner surface of the glass sheath to form a bridge between adjacent turns of the coils, means for flowing a fluid through the substantially unobstructed passage within the glass sheath so as to contact the inner surfaces of the coil turns and the electrolytic film, a first terminal connected to one end of the first coil and a second terminal connected to the opposite end of the second coil.

References Cited in the file of this patent
UNITED STATES PATENTS

| | | |
|---|---|---|
| 2,585,059 | Wallace | Feb. 12, 1952 |
| 2,651,612 | Haller | Sept. 8, 1953 |
| 2,706,366 | Best | Apr. 19, 1955 |
| 2,709,872 | Slomski | June 7, 1955 |
| 2,816,067 | Keidel | Dec. 10, 1957 |
| 2,830,945 | Keidel | Apr. 15, 1958 |